(12) United States Patent
Kano

(10) Patent No.: US 7,009,794 B2
(45) Date of Patent: Mar. 7, 2006

(54) MAGNETIC RECORDING AND REPRODUCING DEVICE

(75) Inventor: Toshio Kano, Miyagi (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 10/955,874

(22) Filed: Sep. 30, 2004

(65) Prior Publication Data

US 2005/0073765 A1    Apr. 7, 2005

(30) Foreign Application Priority Data

Oct. 2, 2003    (JP)    .............................. 2003-343977
Sep. 10, 2004    (JP)    .............................. 2004-264280

(51) Int. Cl.
*G11B 15/14*    (2006.01)
(52) U.S. Cl. ........................ 360/64; 360/76; 360/77.12; 360/55
(58) Field of Classification Search .................... None
See application file for complete search history.

(56) References Cited

U.S. PATENT DOCUMENTS

| | | | | |
|---|---|---|---|---|
| 4,334,252 A | * | 6/1982 | Toriu | .......................... 360/234 |
| 4,607,293 A | * | 8/1986 | Okada et al. | .................. 386/23 |
| 4,646,169 A | * | 2/1987 | Shimpuku | ..................... 360/21 |
| 5,349,478 A | * | 9/1994 | Sato et al. | ..................... 360/55 |
| 5,719,724 A | * | 2/1998 | Kawaguchi | .................. 360/84 |
| 5,901,012 A | * | 5/1999 | Ishida et al. | .................. 360/88 |
| 6,038,098 A | * | 3/2000 | Tsuneki | ....................... 360/84 |
| 6,665,488 B1 | * | 12/2003 | Kaneko et al. | ............... 386/46 |
| 6,804,072 B1 | * | 10/2004 | Yohda et al. | ................. 360/31 |

* cited by examiner

*Primary Examiner*—David Hudspeth
*Assistant Examiner*—Dismery Mercedes
(74) *Attorney, Agent, or Firm*—Robert J. Depke; Trexler, Bushnell, Giangiorgi, Blackstone & Marr, Ltd.

(57) ABSTRACT

In a magnetic recording and reproducing device having a 1$ch$ head and a 2$ch$ head, an azimuth recording operation is carried out on an obliquely evaporated magnetic tape. Angles $\theta1$ and $\theta2$ formed by a direction of a head azimuth of the 1$ch$ head and the 2$ch$ head and a longitudinal direction of the magnetic tape are respectively set to angles at which an output difference between a reproducing signal of a track recorded by the 1$ch$ head and a reproducing signal of a track recorded by the 2$ch$ head is located within three decibels. Thus, an output difference between the two magnetic heads is reduced while the loss of electromagnetic conversion is reduced.

6 Claims, 4 Drawing Sheets

θ: ANGLE FORMED BY DIRECTION OF HEAD AZIMUTH AND LONGITUDINAL DIRECTION OF TAPE (DIRECTION OF OPTIMUM POINT PEAK OF ELECTROMAGNETIC CONVERSION PROPERTY)

θ: ANGLE FORMED BY HEAD AZIMUTH AND LONGITUDINAL DIRECTION OF TAPE (DIRECTION OF OPTIMUM POINT PEAK OF ELECTROMAGNETIC CONVERSION PROPERTY)

TAPE

θ: ANGLE FORMED BY DIRECTION OF HEAD AZIMUTH AND LONGITUDINAL DIRECTION OF TAPE (DIRECTION OF OPTIMUM POINT PEAK OF ELECTROMAGNETIC CONVERSION PROPERTY)

DIRECTION OF HEAD AZIMUTH WITH RESPECT TO LONGITUDINAL DIRECTION OF TAPE
1CH: 25°, 2CH: 155°

MAGNETIC RECORDING AND REPRODUCING DEVICE

The present application claims priority to Japanese Patent Application JP2003-343977, filed in the Japanese Patent Office Oct. 2, 2003, and Japanese Patent Application JP2004-264280, filed in the Japanese Patent Office Sep. 10, 2004; the entire contents of which are incorporated herein by reference.

BACKGROUND OF THE INVENTION

1. Field of the Invention

The present invention relates to a magnetic recording and reproducing device for recording data on a magnetic tape having an anisotropic property by a helical recording system.

2. Description of the Related Art

In a magnetic recording and reproducing device using a magnetic tape, in order to achieve a high density recording operation, a helical recording system is employed that data is obliquely recorded with respect to the longitudinal direction of the tape by a magnetic head attached to a rotary drum.

In this helical recording system, a guard band between adjacent tracks is eliminated to enhance a recording track density. However, a cross-talk that the head picks up a signal on the adjacent track upon reproducing data is undesirably generated.

Thus, to cancel the deterioration of reproduction due to the cross-talk, an azimuth recording system is employed. In the azimuth recording system, data is recorded by using a rotary head (a double azimuth head) having two magnetic heads attached whose azimuth angles (angles of magnetic gaps) have opposite symbols to each other such as +5 to 20° and −5 to 20° (as for the symbols of the angles, a counter-clockwise case relative to a reference line is referred to as + and a clockwise case is referred to as −, hereinafter) so that the two heads alternately scan the tape and the azimuth angles of adjacent tracks are different from each other.

As an example of a magnetic recording medium related to the present invention, a magnetic recording medium disclosed in Japanese Patent Application Laid-Open No. hei 5-36061 is proposed.

In the above-described azimuth recording system, the cross-talk of the adjacent tracks can be reduced. However, in an obliquely evaporated tape, an optimum point peak of an electromagnetic conversion property is present in the moving direction of the tape. An azimuth is set so that a great transfer loss is undesirably generated in an electromagnetic conversion in one magnetic head. Accordingly, for instance, as shown in FIG. 4, RF outputs of the two magnetic heads are unbalanced. Thus, the efficiency of the RF output is not good as the magnetic recording and reproducing system.

A magnetic recording and reproducing system which has been usually used has not good efficiency under its recording density, but meets only the improvement of the performance of a media head. However, a magnetic recording and reproducing device in which the recording density is improved, a track pitch is not larger than 5 μm and the shortest recording wavelength is not larger than 0.3 μm cannot undesirably cover the deterioration of the efficiency only by the countermeasure of a head whose recording and reproducing efficiency is improved by using a thin film type head for any of recording and reproducing heads and media whose property meets the thin film type head.

FIG. 4A shows a relation between an angle θ formed by the azimuth of a head and the longitudinal direction of a tape (the direction of an optimum point peak of an electromagnetic conversion property) and an RF output. FIG. 4B shows azimuth angles of magnetic heads (1$ch$ head, 2$ch$ head) on a first channel and a second channel in a magnetic tape. FIG. 4C shows the definition of the angles θ1 and θ2 in FIG. 4A, and FIG. 4D shows the definition of the angle θ in FIG. 4A.

In FIG. 4, assuming that the azimuth of the head (an inclination angle relative to a reference line shown by a broken line in the drawing (here, a cross line intersecting perpendicularly to the moving direction of the head) is 25° and an angle formed by the longitudinal direction of the tape and the moving direction of the head is 15°, an angle θ1 formed by the azimuth direction of the magnetic head (1$ch$ head) of the first channel and the longitudinal direction of the tape is 10° and the angle θ2 formed by the azimuth direction of the magnetic head (2$ch$ head) of the second channel and the longitudinal direction of the tape is 140°.

Therefore, there is a large level difference between the RF outputs of the 1$ch$ head and the 2$ch$ head, which has a great unbalance.

SUMMARY OF THE INVENTION

The present invention is proposed by taking the above-described problems into consideration and it is an object of the present invention to reduce an output difference between two magnetic heads while the loss of electromagnetic conversion is reduced in a magnetic recording and reproducing device in which a evaporated tape is used, an azimuth recording is carried out, a track pitch is not larger than 5 μm and the shortest recording wavelength is not larger than 0.3 μm.

In order to achieve the above-described object, a magnetic recording and reproducing device according to the present invention comprises: a thin film type head for any of recording and reproducing heads forming a first magnetic head and a second magnetic head and an obliquely evaporated magnetic tape on which an azimuth recording is carried out with a track pitch of not larger than 5 μm and the shortest recording wavelength of not larger than 0.3 μm. An angle formed by the head azimuth direction of each of the first and second magnetic heads and the longitudinal direction of the magnetic tape is set to an angle at which an output difference between a reproducing signal of a track recorded by the first magnetic head and a reproducing signal of a track recorded by the second magnetic head is located within three decibels.

The head azimuth angle of each of the first and second magnetic heads is set to an angle located within a range of ±5 to 30° with respect to a cross line intersecting perpendicularly to the longitudinal direction of the magnetic tape.

A difference between the absolute value of the angle of the head azimuth of the first magnetic head relative to the cross line and the absolute value of the angle of the head azimuth of the second magnetic head relative to the cross line is set to an angle located within 10°.

Accordingly, in the helical scanning drive type magnetic recording and reproducing device using the obliquely evaporated tape, while the loss of electromagnetic conversion between channels is reduced, the balance of outputs between a first channel and a second channel can be obtained. Thus, a recording density is more improved and the margin of an RF output can be obtained.

BRIEF DESCRIPTION OF THE DRAWINGS

FIG. 1 shows the concept of the present invention.

FIG. 2 shows an embodiment of the present invention.

FIG. 4 shows a conventional azimuth recording system.

DETAILED DESCRIPTION OF THE PREFERRED EMBODIMENTS

Figure 1A:
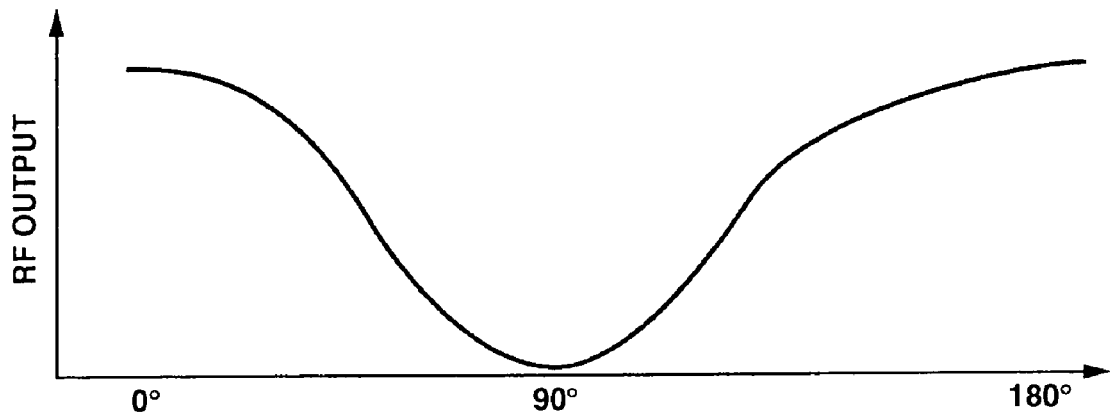
FIG. 1A is an explanatory view showing a relation between an angle θ formed by a direction of a head azimuth and the longitudinal direction of a tape and an RF output.

Now, an embodiment of the present invention will be described below in detail by referring to the drawings. It is to be understood that the present invention is not limited to the embodiment. A magnetic recording and reproducing device according to this embodiment is applied to a magnetic recording and reproducing device comprising a thin film type head for any of recording and reproducing heads forming a first magnetic head and a second magnetic head and an obliquely evaporated magnetic tape on which an azimuth recording is carried out with a track pitch of not larger than 5 μm and the shortest recording wavelength of not larger than 0.3 μm.

The obliquely evaporated magnetic tape is most suitable for improving a high recording density. However, as shown in FIG. 1, there is an optimum point peak of an electromagnetic conversion property in the longitudinal direction of the tape. Further, a direction of a head azimuth and an RF output satisfy a relation expressed by RF output=f(θ+π×n), n=0, ±1, ±2, ±3 . . . .

Figure 4A:
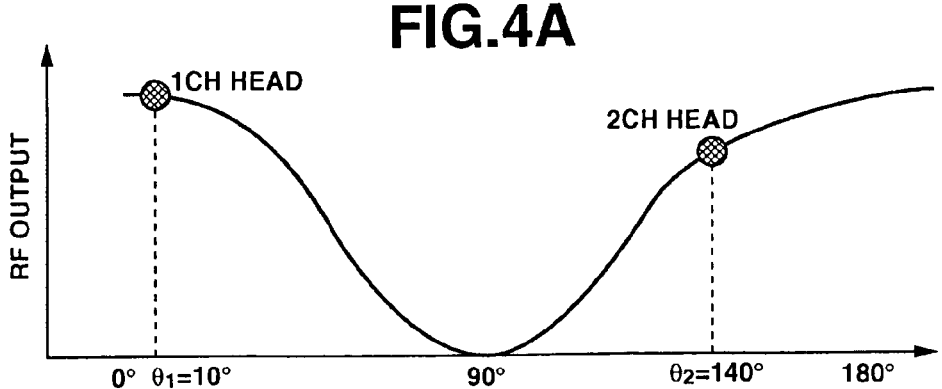
FIG. 4A is a characteristic view showing a relation between an angle θ formed by a direction of a head azimuth and the longitudinal direction of a tape and an RF output.
Figure 4B:
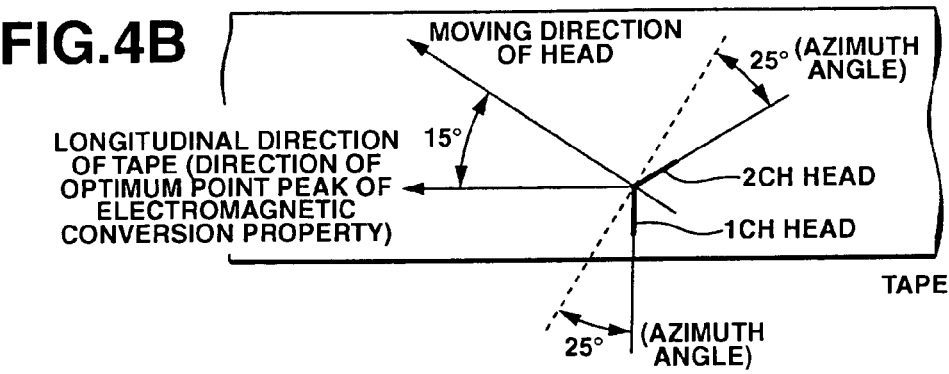
FIG. 4B is an explanatory view showing azimuth directions of magnetic heads (1ch head, 2ch head) of a first channel and a second channel on the surface of a magnetic tape.
Figure 4C:
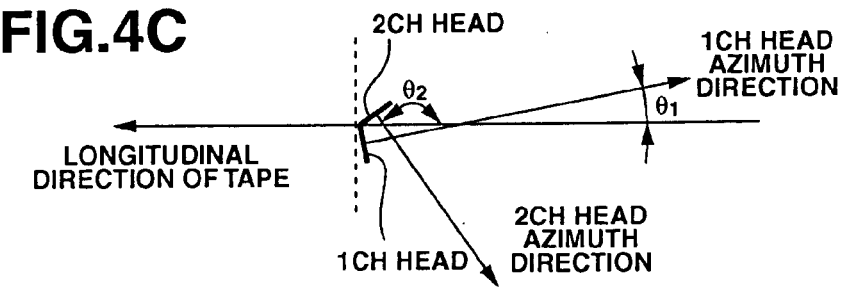
FIG. 4C is an explanatory view showing the definition of the angles θ1 and θ2 in FIG. 4A.
Figure 4D:
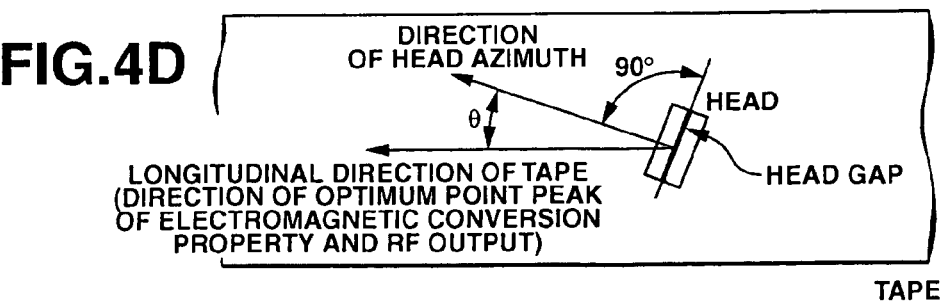
FIG. 4D is an explanatory view showing the definition of the angle θ in FIG. 4A.

In the helical scanning tape drive system, the scanning and moving direction of the head is inclined with respect to the longitudinal direction of the tape as shown in FIG. 4B. Accordingly, in an azimuth recording system using a pair of tracks are used, while a head azimuth of one head is inclined toward a direction near to the optimum direction of the electromagnetic conversion property, the head azimuth of the other head is used so that the electromagnetic conversion property is lowered.

Figure 1B:
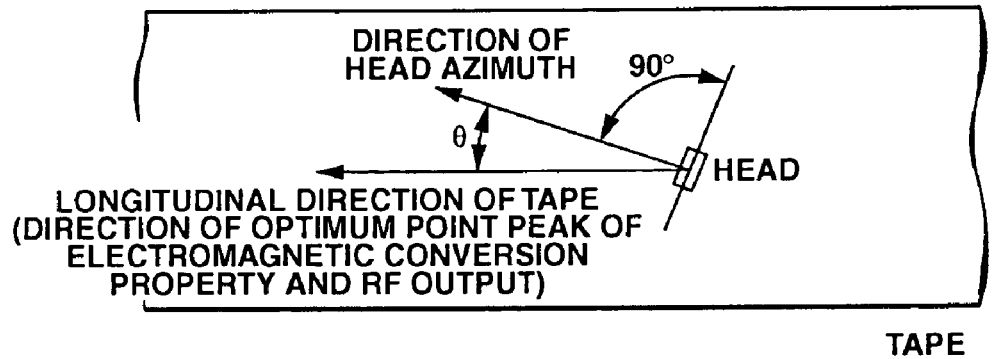
FIG. 1B is an explanatory view showing the definition of the angle θ in FIG. 1A.

In order to solve this problem, according to the present invention, the center of the direction of the azimuth of the head is set not to the scanning and moving direction of the head, but to the longitudinal direction (the direction of the optimum point peak of the electromagnetic conversion property) of the tape as shown in FIG. 1B. Then, the head azimuth is more equally set from this direction as shown in FIG. 2B.

FIG. 1 shows the concept of the present invention and a relation between an angle θ formed by the direction of the head azimuth and the longitudinal direction (the direction of the optimum point peak of the electromagnetic conversion property) of the tape and an RF output. FIG. 1B shows the definition of the angle θ in FIG. 1A.

Figure 2A:
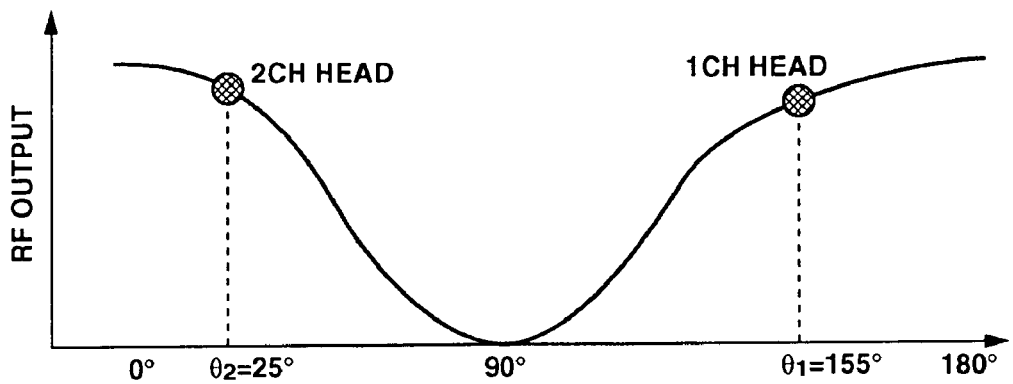
FIG. 2A is a characteristic view showing a relation between an angle θ formed by a direction of a head azimuth and the longitudinal direction (the direction of an optimum point peak of an electromagnetic conversion property) of a tape and an RF output.
Figure 2B:
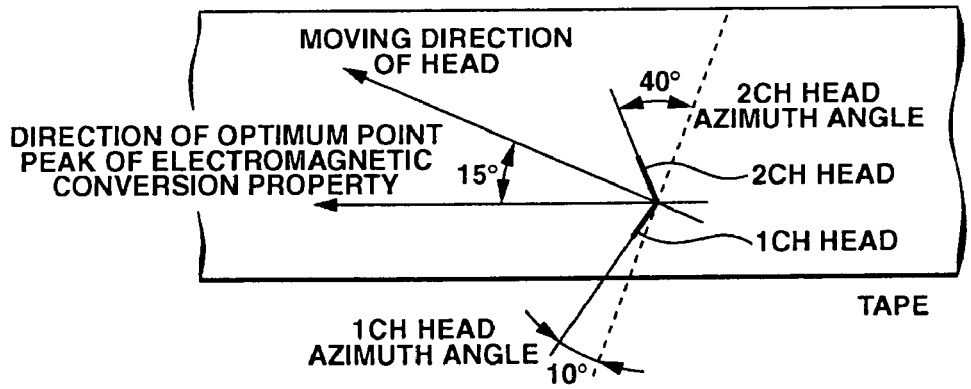
FIG. 2B is an explanatory view showing azimuth angles of magnetic heads (1ch head, 2ch head) of a first channel and a second channel on the surface of a magnetic tape.
Figure 2C:
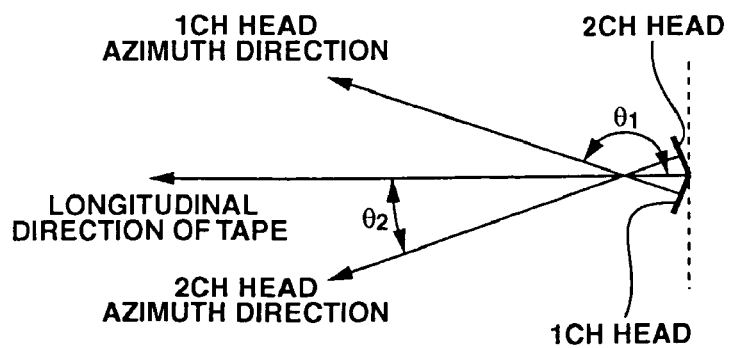
FIG. 2C is an explanatory view showing the definition of the angles θ1 and θ2 in FIG. 2A.

FIG. 2 shows a specific embodiment of the present invention. FIG. 2A shows a relation between an angle θ formed by the direction of the head azimuth and the longitudinal direction (the direction of the optimum point peak of the electromagnetic conversion property) of the tape and an RF output. FIG. 2B shows azimuth angles of magnetic heads (1ch head, 2ch head) of a first channel and a second channel on the surface of the magnetic tape. FIG. 2C shows the definition of the angles θ1 and θ2 in FIG. 2A.

In FIG. 2, the azimuth (an inclination angle relative to a reference line shown by a broken line in FIG. 2B (here, a cross line intersecting perpendicularly to the moving direction of the tape)) of each of the magnetic heads (1ch head, 2ch head) of the first channel and the second channel is 10° and 40° respectively, and an angle θ1 formed by the azimuth direction of the magnetic head (1ch head) of the first channel and the longitudinal direction of the tape is 155° and an angle θ2 formed by the azimuth direction of the magnetic head (2ch head) of the second channel and the longitudinal direction of the tape is 25° as shown in FIGS. 2A and 2C.

Accordingly, the RF outputs of the 1ch head and the 2ch head are equal to each other to achieve a balance. Therefore, according to this embodiment, while the loss of electromagnetic conversion between channels is reduced, the balance of outputs between the first channel and the second channel can be obtained. As a result, a recording density is more improved and the margin of an RF output can be obtained.

In the present invention, the angles θ1 and θ2 are respectively set to angles at which the RF output difference between the 1ch head and the 2ch head is located within 3 dB.

Further, in the present invention, the head azimuth of each of the 1ch head and the 2ch head is set to an angle located within a range of ±5 to 30° with respect to a cross line (a broken line in FIG. 2C) intersecting perpendicularly to the longitudinal direction of the magnetic tape.

Further, in the present invention, a difference between the absolute value of the angle of the head azimuth of the 1ch head relative to the cross line and the absolute value of the angle of the head azimuth of the 2ch head relative to the cross line is set to an angle located within 10°.

Figure 3:
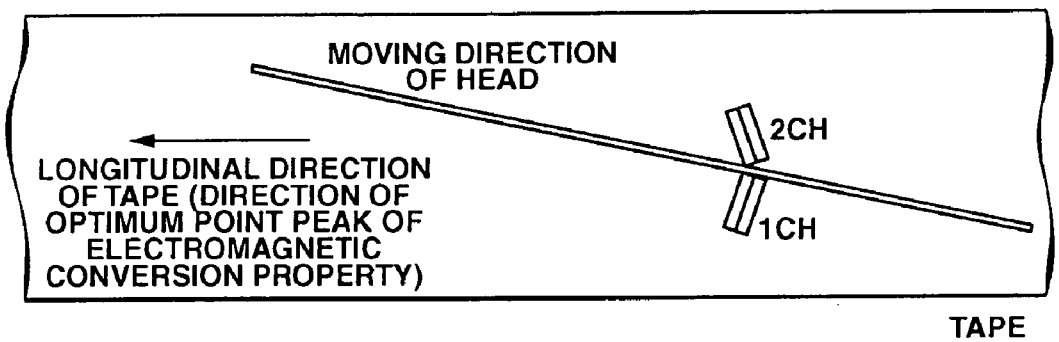
FIG. 3 is an explanatory view showing the azimuth directions of the magnetic heads on the surface of the tape.

FIG. 3 shows an arrangement relation between the 1ch head and the 2ch head when an angle formed by the moving direction of the head and the longitudinal direction of the tape is 15° and the direction of the head azimuth relative to the longitudinal direction of the tape is 25°.

While the invention has been described in accordance with certain preferred embodiments thereof illustrated in the accompanying drawings and described in the above description in detail, it should be understood by those ordinarily skilled in the art that the invention is not limited to the embodiments, but various modifications, alternative constructions or equivalents can be implemented without departing from the scope and spirit of the present invention as set forth and defined by the appended claims.

What is claimed is:

1. A magnetic recording and reproducing device comprising:
   a first magnetic head and a second magnetic head; and
   an obliquely evaporated magnetic tape on which an azimuth recording is carried out with a track pitch of not larger than 5 $\mu$m and a shortest recording wavelength of not larger than 0.3 $\mu$m, wherein an angle formed by a head azimuth direction of each of the first and second magnetic heads and a longitudinal direction of the magnetic tape is set to an angle at which an output difference between a reproducing signal of a track recorded by the first magnetic head and a reproducing signal of a track recorded by the second magnetic head is located within three decibels.

2. The magnetic recording and reproducing device according to claim 1, wherein the head azimuth angle of each of the first and second magnetic heads is set to an angle located within a range of ±5 to 30° with respect to a cross line intersecting perpendicularly to the longitudinal direction of the magnetic tape.

3. The magnetic recording and reproducing device according to claim 2, wherein a difference between an absolute value of the angle of the head azimuth of the first magnetic head relative to the cross line and an absolute value of the angle of the head azimuth of the second magnetic head relative to the cross line is set to an angle located within 10°.

4. The magnetic recording and reproducing device according to claim 1, wherein a thin film type head is used for either the first magnetic head or the second magnetic head.

5. The magnetic recording and reproducing device according to claim 2, wherein a thin film type head is used for either the first magnetic head or the second magnetic head.

6. The magnetic recording and reproducing device according to claim 3, wherein a thin film type head is used for either the first magnetic head or the second magnetic head.

* * * * *